United States Patent
Wada et al.

(10) Patent No.: US 10,904,411 B2
(45) Date of Patent: Jan. 26, 2021

(54) ELECTRONIC EQUIPMENT

(71) Applicant: PANASONIC I-PRO SENSING SOLUTIONS CO., LTD., Fukuoka (JP)

(72) Inventors: Jyouji Wada, Fukuoka (JP); Hideaki Yamada, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/807,727

(22) Filed: Mar. 3, 2020

(65) Prior Publication Data

US 2020/0288044 A1 Sep. 10, 2020

(30) Foreign Application Priority Data

Mar. 4, 2019 (JP) ................. 2019-038310

(51) Int. Cl.
*H04N 5/225* (2006.01)
*H02J 50/00* (2016.01)
*H02J 50/10* (2016.01)

(52) U.S. Cl.
CPC ......... *H04N 5/2252* (2013.01); *H02J 50/005* (2020.01); *H02J 50/10* (2016.02); *H04N 5/2254* (2013.01)

(58) Field of Classification Search
CPC ..... H04N 5/2252; H04N 5/2254; H02J 50/10; H02J 50/005
See application file for complete search history.

(56) References Cited

U.S. PATENT DOCUMENTS

| | | | |
|---|---|---|---|
| 2010/0295378 A1* | 11/2010 | Suzuki | H02J 7/025 307/104 |
| 2015/0349578 A1* | 12/2015 | Hu | H01F 27/2804 320/108 |
| 2017/0279315 A1 | 9/2017 | Sakata et al. | |
| 2018/0123392 A1* | 5/2018 | Pinciuc | H02J 7/0042 |
| 2019/0097448 A1* | 3/2019 | Partovi | H02J 7/00304 |
| 2019/0348871 A1 | 11/2019 | Sakata et al. | |

FOREIGN PATENT DOCUMENTS

| JP | 59-12164 B2 | 3/1984 |
|---|---|---|
| JP | 9-90463 A | 4/1997 |
| JP | 2004-53876 A | 2/2004 |
| JP | 2006-251225 A | 9/2006 |
| JP | 2015-61230 A | 3/2015 |
| JP | 2017-70184 A | 4/2017 |
| JP | 2018-129863 A | 8/2018 |

\* cited by examiner

*Primary Examiner* — Anner N Holder
(74) *Attorney, Agent, or Firm* — Seed IP Law Group LLP (57) ABSTRACT

An electronic equipment includes an attachment fixed to an object; and a main body. The attachment has a first fitting portion provided on an outer face of a first housing of the attachment and having a first glass, and a power transmitting coil to wirelessly transmit power. The main body has a second fitting portion provided on an outer face of a second housing of the main body and having a second glass, which is attachable to and detachable from the first fitting portion, and a power receiving coil to wirelessly receive the power transmitted from the power transmitting coil.

10 Claims, 5 Drawing Sheets

ELECTRONIC EQUIPMENT

BACKGROUND OF THE INVENTION

1. Field of the Invention

The present disclosure relates to an electronic equipment.

2. Background Art

According to the related art, capturing devices that improve reliability of the capturing devices have been proposed (for example, see JP-A-2015-61230). The capturing device includes an capturing unit that acquires image information, a power supply unit that supplies power to the capturing unit, a power receiving coil that wirelessly receives power from a power transmitting device and supplies the received power to the power supply unit, a housing that houses the power supply unit and the power receiving coil and holds the capturing unit. The housing is movable with respect to the power transmitting device.

Dirt adheres, with the passage of time, to an electronic equipment such as a surveillance camera installed in a structure such as a building. An electronic equipment to be detached from a building or the like and cleaned may be damaged, for example, by colliding with another object or the like when being detached from the building or the like and carried or cleaned.

SUMMARY OF THE INVENTION

A non-restrictive example of the present disclosure contributes to providing an electronic equipment in which damage is suppressed in a state where the electronic equipment is detached from a structure.

An electronic equipment according to one aspect of the present disclosure includes: a seat which is provided with a first fitting portion on an outer side of a housing and fixed to a structure; and a body of the electronic equipment which is provided, on the outer side of a housing, with a second fitting portion attachable to and detachable from the first fitting portion, wherein the second fitting portion includes a recess into which the first fitting portion is fitted, the surface of the first fitting portion facing the bottom surface of the recess is formed of a first glass, the bottom surface of the recess is formed of a second glass, a power transmitting coil for wirelessly transmitting power is provided inside the housing of the seat at a position where the power transmitting coil fits within the outer edge of the first glass in plan view, and a power receiving coil for receiving the power is provided inside the housing of the electronic equipment body at a position where the power receiving coil fits within the outer edge of the second glass in plan view.

An electronic equipment according to one aspect of the present disclosure includes: a seat which is provided with a first fitting portion on an outer side of a housing and fixed to a structure; and a body of the electronic equipment which is provided, on the outer side of a housing, with a second fitting portion attachable to and detachable from the first fitting portion, wherein the second fitting portion includes a recess into which the first fitting portion is fitted, the surface of the first fitting portion facing the bottom surface of the recess is formed of a first glass, the bottom surface of the recess is formed of a second glass, a first antenna is provided inside the housing of the seat at a position where the first antenna fits within the outer edge of the first glass in plan view, and a second antenna for communicating with the first antenna is provided inside the housing of the electronic equipment body at a position where the second antenna fits within the outer edge of the second glass in plan view.

These general and specific modes may be embodied by a system, a device, a method, an integrated circuit, a computer program, or a recording medium, or may be embodied by any combination of a system, a device, a method, an integrated circuit, a computer program, and a recording medium.

According to one aspect of the present disclosure, damage is suppressed in a state of being detached from a structure.

Further advantages and effects of the aspect of the present disclosure will be apparent from the description and drawings. Such advantages and/or effects are provided by features described in some embodiments, the description and the drawings, but all are not necessarily provided to obtain one or more identical features.

DETAILED DESCRIPTION OF THE EXEMPLARY EMBODIMENT

An embodiment of the present invention will be explained in detail with reference to accompanying drawings as appropriate. However, more detailed description than necessary may be omitted. For example, detailed explanation of already well-known matters and duplicate explanation for substantially the same configuration may be omitted. This is to avoid the following explanation becoming unnecessarily redundant and facilitate understanding by those skilled in the art.

The attached drawings and the following description are provided to enable those skilled in the art to fully understand the present disclosure but not intended to limit the claimed subject matter. Hereinafter, a case where an electronic equipment of the present disclosure is applied to a surveillance camera will be described.

Figure 1:
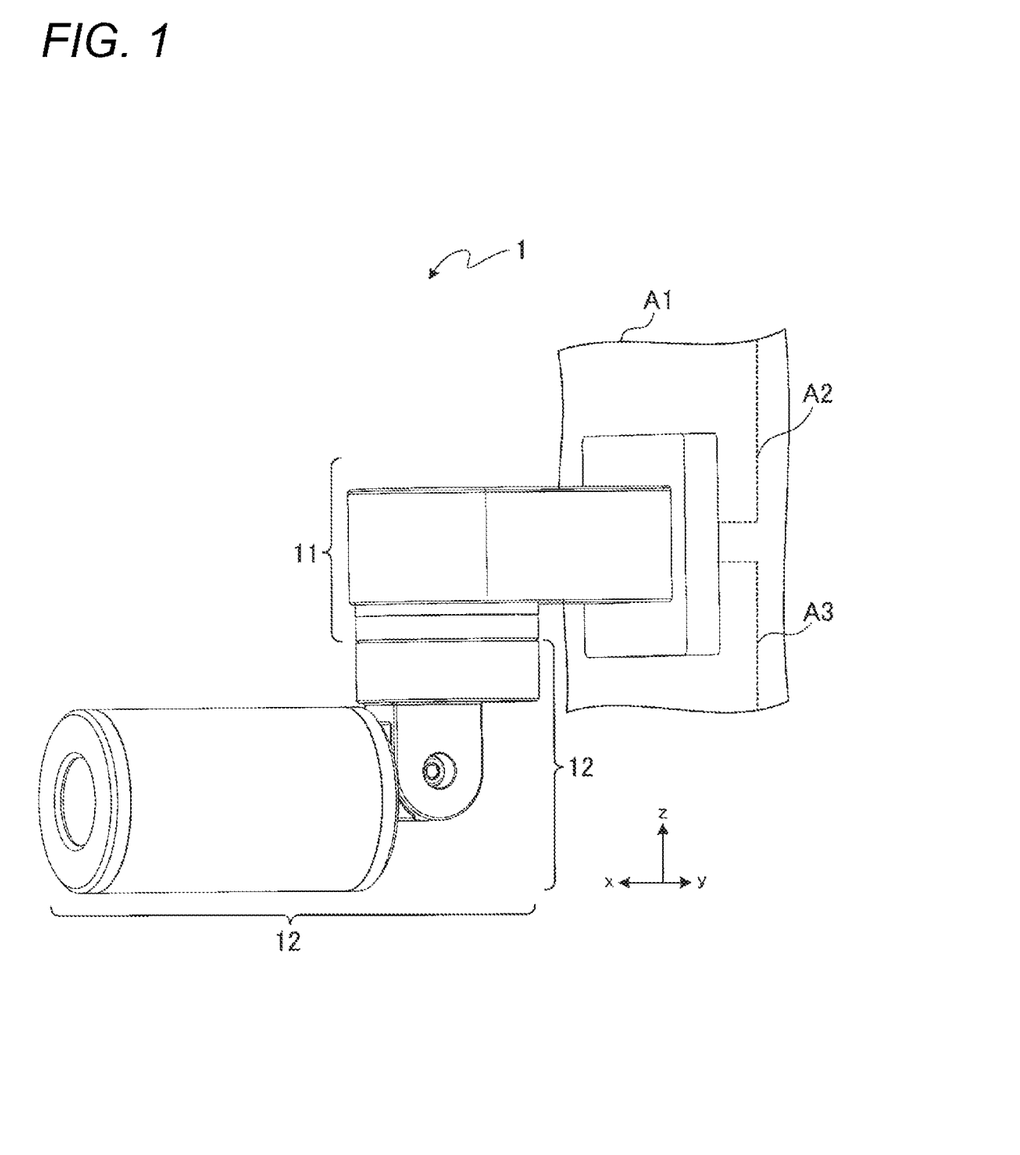
FIG. 1 is a perspective view of a surveillance camera according to an embodiment.

FIG. 1 is a perspective view of a surveillance camera 1 according to an embodiment. As shown in FIG. 1, the surveillance camera 1 has a seat 11 and a camera body 12. In the following, three orthogonal coordinate axes shown in FIG. 1 are set for the surveillance camera 1.

The seat 11 is fixed to a structure. The structure may be, for example, an indoor or outdoor wall of a building, an indoor ceiling, a utility pole, a traffic light, or the like. A structure A1 shown in FIG. 1 shows a part of a wall of a building.

The camera body 12 is attachable to and detachable from the seat 11. FIG. 1 shows a state where the camera body 12 is attached to the seat 11. The camera body 12 is fixed to the structure A1 by being attached to the seat 11 fixed to the structure A1. The camera body 12 is separated from the structure A1 by being detached from the seat 11 (see, for example, FIGS. 2 and 3).

The seat 11 is supplied with, for example, AC (Alternating Current) power of 100 V via a power line. A power supply line A2 indicated by a dotted line in FIG. 1 shows a power supply line wired in the structure A1.

The seat 11 supplies, by wireless power feeding, the power supplied via the power supply line A2 to the camera body 12 which is attached to the seat 11. The camera body 12 operates by the power supplied wirelessly from the seat 11.

The seat 11 is connected to a network such as the Internet via a network cable. A network cable A3 indicated by a dotted line in FIG. 1 shows a network cable wired in the structure A1.

The camera body 12 attached to the seat 11 communicates with a server or a terminal device which is connected to the network via wireless communication with the seat 11.

The seat 11 may be connected to the network such as the Internet by wireless communication such as Wi-fi (registered trademark) or Bluetooth (registered trademark). Alternatively, the seat 11 may be connected to the network such as the Internet via the power supply line A2 (PLC: Power Line Communication). In this case, the seat 11 may not be connected to the network cable A3.

Figure 2:
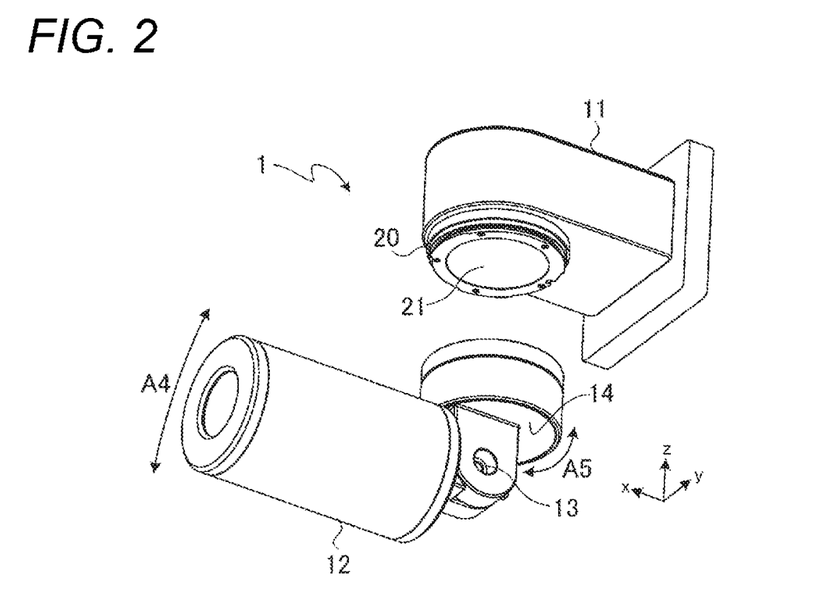
FIG. 2 is a perspective view of the surveillance camera when a body of the camera is separated from a seat.

FIG. 2 is a perspective view of the surveillance camera 1 when the camera body 12 is separated from the seat 11. In FIG. 2, the same components as those in FIG. 1 are denoted by the same symbols.

As shown in FIG. 2, the seat 11 includes, on an outer side of a housing thereof, a fitting portion 20 having a cylindrical shape. The fitting portion 20 includes a circular plate-shaped glass 21 at the end (end face) thereof.

A housing of the seat 11 excluding the glass 21 is formed of, for example, stainless steel. For example, SUS316L may be used for the stainless steel.

The camera body 12 includes a shaft 13. The camera body 12 rotates in a tilt direction around the shaft 13 as a rotation shaft. For example, the camera body 12 rotates in the direction of a double arrow A4 shown in FIG. 2.

The camera body 12 includes a shaft 14. The camera body 12 rotates in a pan direction around the shaft 14 as a rotation shaft. For example, the camera body 12 rotates in the direction of a double arrow A5 shown in FIG. 2.

Figure 3:
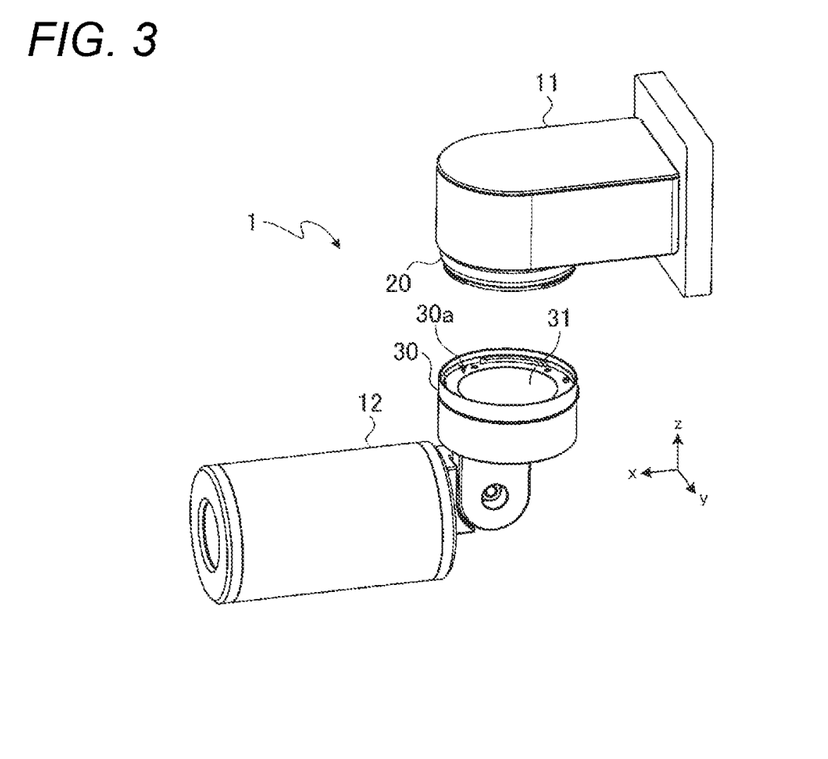
FIG. 3 is a perspective view of the surveillance camera when the camera body is separated from the seat.

FIG. 3 is a perspective view of the surveillance camera 1 when the camera body 12 is separated from the seat 11. In FIG. 3, the same components as those in FIGS. 1 and 2 are denoted by the same symbols.

As shown in FIG. 3, the camera body 12 includes, on an outer side of a housing thereof, a fitting portion 30 having a cylindrical shape. The fitting portion 30 includes a cylindrical recess 30a into which the fitting portion 20 of the seat 11 is fitted. A part of the fitting portion 20 of the seat 11 fits in the recess 30a of the fitting portion 30. The bottom surface of the recess 30a of the fitting portion 30 is formed of glass 31.

The housing of the camera body 12 excluding the glass 31 is formed of, for example, stainless steel. For example, SUS316L may be used for the stainless steel.

Figure 4:
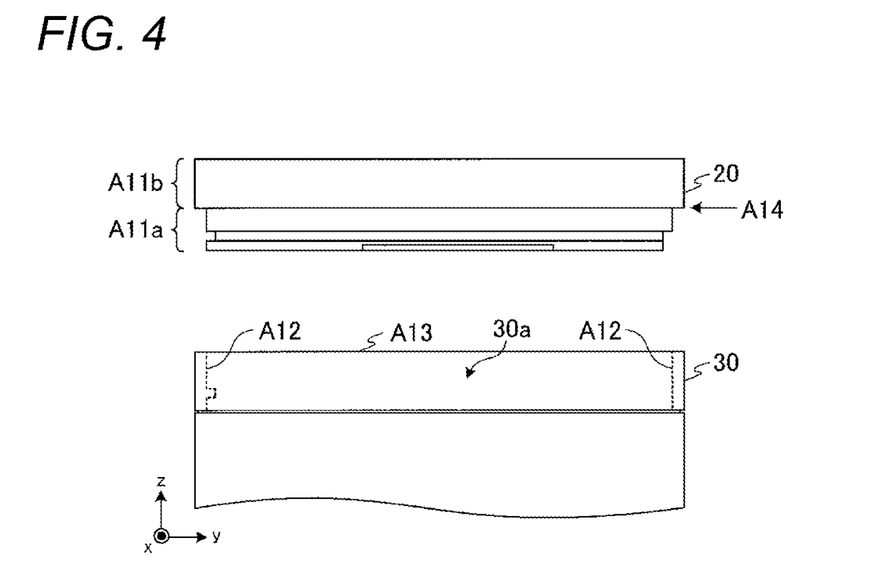
FIG. 4 is a side view of fitting portions.

FIG. 4 is a side view of fitting portions 20 and 30. In FIG. 4, the same components as those in FIGS. 1 to 3 are denoted by the same symbols.

The fitting portion 20 has a shape obtained by combining two cylinders having different diameters. For example, as shown in FIG. 4, the diameter of a cylindrical portion A11a on the end side (end face side) of the fitting portion 20 is smaller than the diameter of a cylindrical portion A11b on the body side of the seat 11.

A dotted line A12 indicated in the fitting portion 30 in FIG. 4 shows the inner wall of the recess 30a formed in the fitting portion 30. The diameter of the cylindrical portion A11b of the fitting portion 20 is larger than the diameter of the recess 30a of the fitting portion 30.

On the other hand, the diameter of the cylindrical portion A11a on the end side of the fitting portion 20 is such that the cylindrical portion A11a fits into the recess 30a formed in the fitting portion 30. For example, the diameter of the cylindrical portion A11a on the end side of the fitting portion 20 is such that the circumferential surface of the cylindrical portion A11a is in contact with the circumferential surface of the recess 30a of the fitting portion 30 (a portion indicated by the dotted line A12 in FIG. 4).

As a result, the fitting portion 20 is fitted into the fitting portion 30 until an upper end A13 of the fitting portion 30 contacts the cylindrical portion A11a on the body side of the fitting portion 20 (until the upper end A13 of the fitting portion 30 is located at a portion indicated by an arrow A14 in FIG. 4).

The seat 11 wirelessly transmits power to the camera body 12 attached to the seat 11. The wireless power feeding from the seat 11 to the camera body 12 is performed in the fitting portions 20 and 30. As the wireless power feeding, for example, a magnetic field resonance method, an electromagnetic induction method, an electric field coupling method, or a radio wave reception method may be applied.

The seat 11 and the camera body 12 perform short-range wireless communication at the fitting portions 20 and 30. The seat 11 and the camera body 12 may perform communication based on, for example, a communication format of PLC communication.

As described above, the camera body 12 is supplied with power by the wireless power feeding. The camera body 12 performs the wireless communication with the seat 11. Thus, when the camera body 12 is detached from the seat 11, it is not necessary to disconnect a power cable or a communication cable. That is, when the fitting portion 30 of the camera body 12 is detached from the fitting portion 20 of the seat 11, the camera body 12 immediately becomes free with respect to the seat 11 (structure A1).

As described above, the fitting portion 30 of the camera body 12 includes the recess 30a, and the bottom surface of the recess 30a is formed of the glass 31. As will be described with reference to FIG. 7, a power receiving coil that receives power and an antenna that performs wireless communication with the seat 11 are arranged on the lower side (on a −z axis direction side) of the glass 31.

With this arrangement, the glass 31, the power receiving coil, and the antenna are arranged at a position recessed from the surface of the housing of the camera body 12 (for example, the upper end A13 of the fitting portion 30 shown in FIG. 4). Thus, the glass 31, the power receiving coil, and the antenna of the camera body 12 detached from the seat 11 are protected from damage due to a collision with another object, or the like.

Figure 5:
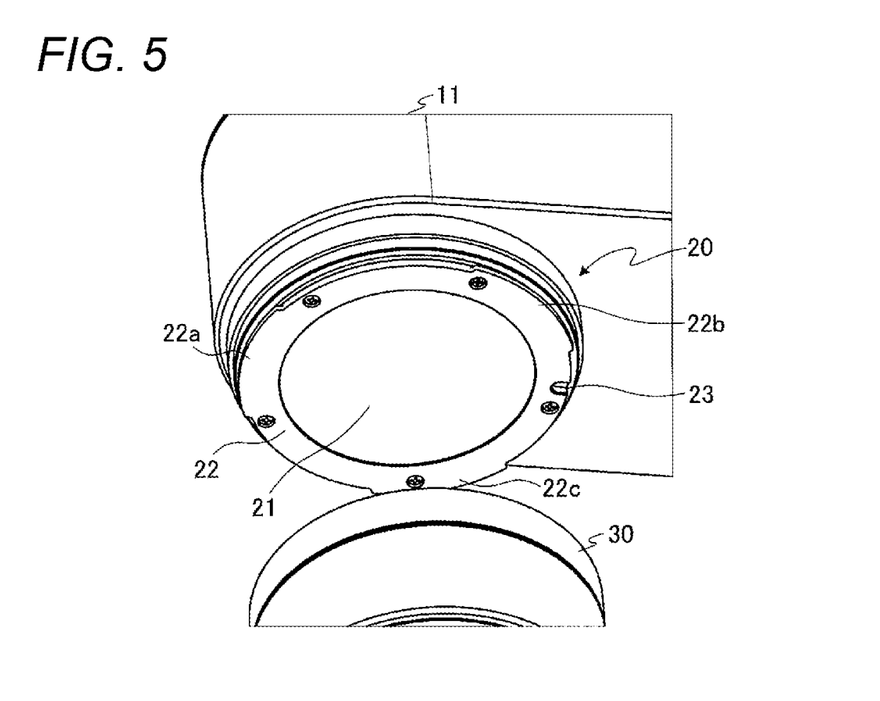
FIG. 5 is a perspective view of the fitting portions.

FIG. 5 is a perspective view of the fitting portions 20 and 30. In FIG. 5, the same components as those in FIGS. 1 to 4 are denoted by the same symbols.

As shown in FIG. 5, the end face of the fitting portion 20 is constituted by the glass 21 and a ring member 22. The ring member 22 is a ring-shaped plate-like member having an opening at the center. The glass 21 is arranged at the opening of the ring member 22.

The ring member 22 includes three flanges 22a to 22c on the outer edge. The diameter of the three flanges 22a to 22c is larger than the diameter of a portion of the ring member where the three flanges 22a to 22c are not formed. The ring member 22 has a U-shaped recess 23 on the outer edge.

Figure 6:
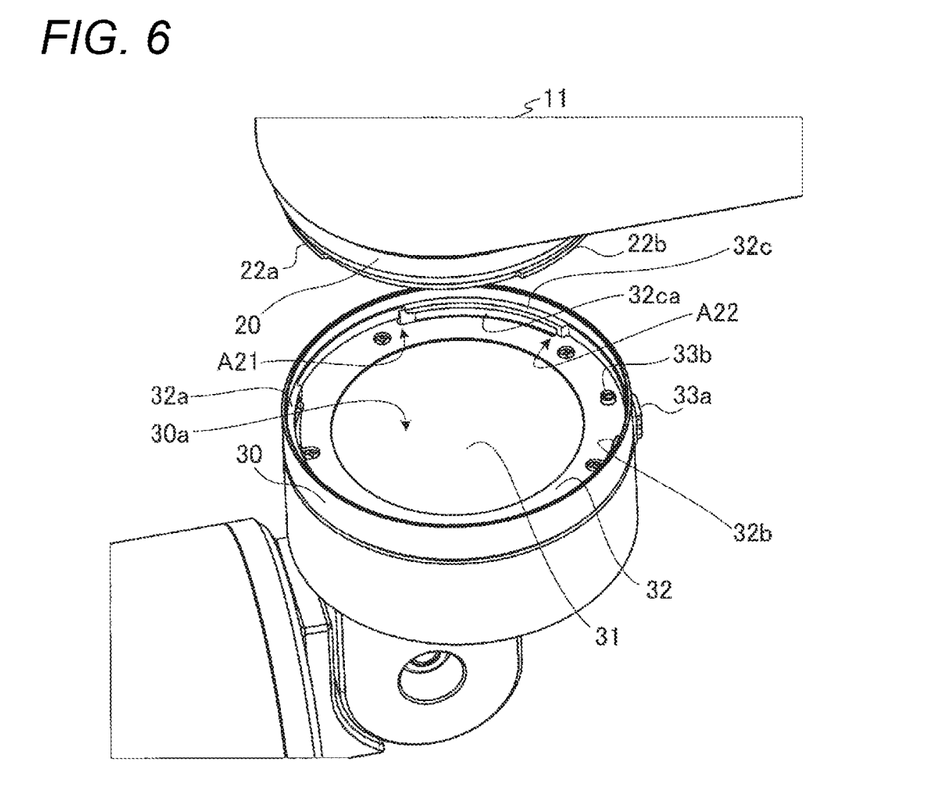
FIG. 6 is a perspective view of the fitting portions.

FIG. 6 is a perspective view of the fitting portions 20 and 30. In FIG. 6, the same components as those in FIGS. 1 to 5 are denoted by the same symbols. FIG. 6 shows the flanges 22a and 22b shown in FIG. 5.

As shown in FIG. 6, the bottom surface of the recess 30a of the fitting portion 30 is constituted by the glass 31 and a ring member 32. The ring member 32 is a ring-shaped plate-like member having an opening at the center. The glass 31 is arranged at the opening of the ring member 32.

The ring member 32 includes three receiving portions 32a to 32c on the outer edge. The receiving portions 32a to 32c are higher than the bottom surface of the recess 30a of the fitting portion 30.

The receiving portion 32c includes a groove 32ca shaped along the outer edge. The receiving portion 32c includes the groove 32ca from a position indicated by an arrow A21 to a position indicated by an arrow A22.

The flange 22c shown in FIG. 5 is inserted into the groove 32ca of the receiving portion 32c from the position indicated by the arrow A21 shown in FIG. 6. The flange 22c shown in FIG. 5 is inserted along the groove 32ca to the position indicated by the arrow A22 shown in FIG. 6.

Similarly to the groove 32ca of the receiving portion 32c, a groove into which the flange 22a shown in FIG. 5 is inserted is formed in the receiving portion 32a. Similarly to the groove 32ca of the receiving portion 32c, a groove into which the flange 22b shown in FIG. 5 is inserted is formed in the receiving portion 32b.

The fitting portion 30 includes a button 33a and a pin 33b. The button 33a is arranged on the outer circumferential surface of the fitting portion 30. The button 33a is movable in the normal direction (±z-axis direction) to the bottom surface of the recess 30a.

The pin 33b is arranged on the bottom surface of the recess 30a. The pin 33b is movable in the normal direction to the bottom surface of the recess 30a in the fitting portion 30 in conjunction with the movement of the button 33a. The pin 33b usually protrudes from the bottom surface of the recess 30a of the fitting portion 30 by, for example, a biasing member such as a spring. The pin 33b has, for example, a cylindrical shape, and has a shape that fits into the recess 23 shown in FIG. 5.

When fixing the camera body 12 to the seat 11, the fitting portion 20 is fitted into the recess 30a of the fitting portion 30 so that the flanges 22a to 22c of the fitting portion 20 do not contact the receiving portions 32a to 32c of the fitting portion 30. Then, the fitting portion 30 is turned, thereby inserting the flanges 22a to 22c of the fitting portion 20 into the grooves of the receiving portions 32a to 32c of the fitting portion 30. When the pin 33b of the fitting portion 30 fits into the recess 23 of the ring member 22 of the fitting portion 20, the camera body 12 is fixed to the seat 11.

When detaching the camera body 12 from the seat 11, the button 33a is operated so that the pin 33b is retracted toward the bottom surface of the recess 30a (the button 33a is lowered in the −z axis direction). When the pin 33b is retracted toward the bottom surface of the recess 30a, the camera body 12 can rotate with respect to the seat 11. By rotating the camera body 12 and thus detaching the flanges 22a to 22c from the grooves of the receiving portions 32a to 32c, the camera body 12 can be detached from the seat 11.

Figure 7:
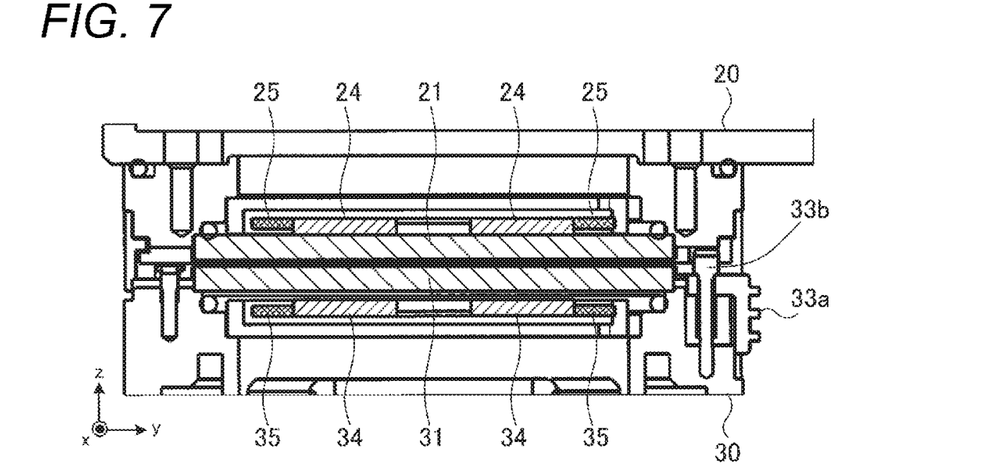
FIG. 7 is a cross-sectional view of the fitting portions.

FIG. 7 is a cross-sectional view of the fitting portions 20 and 30. In FIG. 7, the same components as those in FIGS. 1 to 6 are denoted by the same symbols. As shown in FIG. 7, when the camera body 12 is attached to the seat 11, the surface of the glass 21 of the seat 11 and the surface of the glass 31 of the camera body 12 face and approach each other.

As shown in FIG. 7, the fitting portion 20 includes a power transmitting coil 24 and an antenna 25. The fitting portion 30 includes a power receiving coil 34 and an antenna 35.

The power transmitting coil 24 is arranged on the lower side of the glass 21 (on the +z axis direction side). For example, the power transmitting coil 24 is arranged inside the housing of the seat 11 and at a position where the power transmitting coil fits within the outer edge of the glass 21 in plan view (when viewed from the z-axis direction). The power transmitting coil 24 may be arranged, for example, close to or in contact with the lower surface of the glass 21.

The power transmitting coil 24 has a ring shape with an opening at the center thereof. Various winding methods may be used for the power transmitting coil 24. For example, a regular winding or an alpha winding may be used for the power transmitting coil 24.

The antenna 25 is arranged on the lower side of the glass 21 (on the +z axis direction side). For example, the antenna 25 is arranged inside the housing of the seat 11 and at a position where the antenna fits within the outer edge of the glass 21 in plan view. The antenna 25 may be arranged, for example, close to or in contact with the lower surface of the glass 21.

The antenna 25 has a ring shape with an opening at the center thereof. The power transmitting coil 24 is arranged in the central opening of the antenna 25. The antenna 25 may be arranged, for example, such that the inner side of the antenna 25 is in contact with the outer side of the power transmitting coil 24. As the antenna 25, for example, a loop antenna may be used.

The power receiving coil 34 is arranged on the lower side of the glass 31 (on the −z axis direction side). For example, the power receiving coil 34 is arranged inside the housing of the camera body 12 and at a position where the power receiving coil fits within the outer edge of the glass 31 in plan view. The power receiving coil 34 may be arranged, for example, close to or in contact with the lower surface of the glass 31.

The power receiving coil 34 has a ring shape with an opening at the center thereof. Various winding methods may be used for the power receiving coil 34. For example, a regular winding or an alpha winding may be used for the power receiving coil 34.

The antenna 35 is arranged on the lower side of the glass 31 (on the −z axis direction side). For example, the antenna 35 is arranged inside the housing of the camera body 12 and at a position where the antenna fits within the outer edge of the glass 31 in plan view. The antenna 35 may be arranged, for example, close to or in contact with the lower surface of the glass 31.

The antenna 35 has a ring shape with an opening at the center thereof. The power receiving coil 34 is arranged in the central opening of the antenna 35. The antenna 35 may be arranged, for example, such that the inner side of the antenna 35 is in contact with the outer side of the power receiving coil 34. As the antenna 35, for example, a loop antenna may be used.

The power transmitting coil 24 and the power receiving coil 34 are arranged in the fitting portions 20 and 30 such that the center of the power transmitting coil 24 and the center of the power receiving coil 34 coincide when the camera body 12 is attached to the seat 11. The antenna 25 and the antenna 35 are arranged in the fitting portions 20 and 30 such that the center of the antenna 25 and the center of the antenna 35 coincide when the camera body 12 is attached to the seat 11.

When the power transmitted from the seat 11 to the camera body 12 is 10 W and the communication speed between the seat 11 and the camera body 12 is 240 Mbps, the respective dimensions of the glasses 21 and 31, the power transmitting coil 24, the power receiving coil 34, and the antennas 25 and 35 preferably have the following values. When the dimensions have the following values, the transmission power of 10 W and the communication speed of 240 Mbps can be obtained, and desired strength can be obtained in the glasses 21 and 31.

The inner diameter (diameter of the central opening) of the power transmitting coil 24 and the power receiving coil 34 is, for example, 9 mm. The outer diameter (diameter of the outer circumference) of the power transmitting coil 24 and the power receiving coil 34 is, for example, 34 mm. The outer diameter (diameter of the outer circumference) of the antennas is, for example, 44 mm. When the camera body 12 is attached to the seat 11, the facing distance between the power transmitting coil 24 and the power receiving coil 34 is, for example, 7.8 mm.

The diameter of the glasses 21 and 31 is, for example, 58 mm. The thickness of the glasses 21 and 31 is, for example, 3 mm. When the camera body 12 is attached to the seat 11, the facing distance between the glasses 21 and 31 is, for example, 0.8 mm.

Even in the range of the following values, the transmission power of 10 W and the communication speed of 240 Mbps can be obtained, and the desired strength can be obtained in the glasses 21 and 31. For example, the inner diameter of the power transmitting coil 24 and the power receiving coil 34 may be 7 mm or more and 11 mm or less. The outer diameter of the power transmitting coil 24 and the power receiving coil 34 may be 31 mm or more and 37 mm or less. The outer diameter (diameter of the outer circumference) of the antennas may be 41 mm or more and 47 mm or less. The facing distance between the power transmitting coil 24 and the power receiving coil 34 when the camera body 12 is attached to the seat 11 may be, for example, 6.8 mm or more and 8.8 mm or less.

The diameter of the glasses 21 and 31 may be 55 mm or more and 61 mm or less. The thickness of the glasses 21 and 31 may be, for example, 2 mm or more and 4 mm or less. The facing distance between the glasses 21 and 31 when the camera body 12 is attached to the seat 11 may be, for example, 0.6 mm or more and 1.0 mm or less.

To increase the transmission power, the outer diameter of the power transmitting coil 24 and the power receiving coil 34 may be increased. When the outer diameter of the power transmitting coil 24 and the power receiving coil 34 is increased, the diameter of the glasses 21, 31 is increased so that the power transmitting coil 24, the power receiving coil 34, and the antennas 25, 35 fall within the diameter of the glasses 21, 31. When the diameter of the glasses 21 and 31 is increased, the thickness of the glasses 21 and 31 is increased so as to obtain the desired strength. However, it should be noted that the distance between the power transmitting coil 24 and the power receiving coil 34 affects the power efficiency.

To increase the communication speed, the outer diameter of the antennas 25 and 35 may be increased. When the outer diameter of the antennas 25 and 35 is increased, the diameter of the glasses 21, 31 is increased so that the power transmitting coil 24, the power receiving coil 34, and the antennas 25, 35 fall within the diameter of the glasses 21, 31. However, it should be noted that the distance between the antennas 25 and 35 affects the power efficiency.

Figure 8:
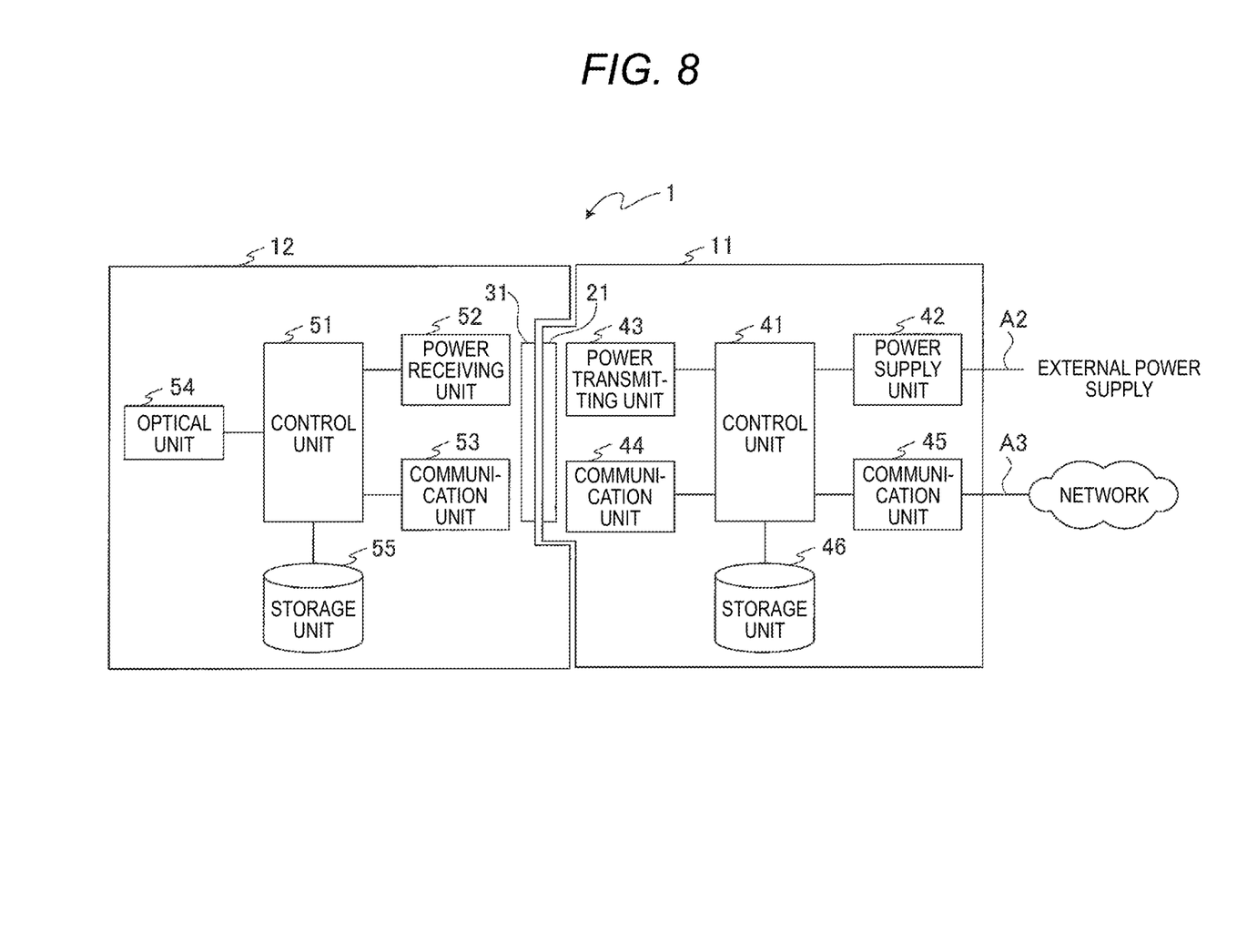
FIG. 8 is a diagram showing an example of a block configuration of the surveillance camera.

FIG. 8 is a diagram showing an example of a block configuration of the surveillance camera 1. In FIG. 8, the same components as those in FIGS. 1 to 7 are denoted by the same symbols. As shown in FIG. 8, the seat 11 includes a control unit 41, a power supply unit 42, a power transmitting unit 43, communication units 44 and 45, and a storage unit 46. The camera body 12 includes a control unit 51, a power receiving unit 52, a communication unit 53, an optical unit 54, and a storage unit 55.

The control unit 41 controls the entire seat 11. The control unit 41 may be configured by, for example, a CPU (Central Processing Unit).

The power of an external power supply is supplied to the power supply unit 42. For example, the power supply unit 42 is supplied with 100 V AC power. The power supply unit 42 supplies the power of the external power supply to each unit.

The power transmitting unit 43 includes the power transmitting coil 24 shown in FIG. 7. The power transmitting unit 43 wirelessly transmits power supplied from the power supply unit 42 to the camera body 12 via the power transmitting coil 24.

The communication unit 44 includes the antenna 25 shown in FIG. 7. The communication unit 44 wirelessly communicates with the communication unit 53 of the camera body 12 via the antenna 25.

The communication unit 44 receives video data transmitted from the camera body 12. The control unit 41 may transmit the video data received by the communication unit 44 to the server or the terminal device connected to the network via the communication unit 45.

The communication unit 45 is connected to the network such as the Internet. The communication unit 45 communicates with, for example, the server or the terminal device connected to the network.

The server or the terminal device connected to the network may transmit a control signal for controlling, for example, start and stop of capturing to the surveillance camera 1. The server or the terminal device connected to the network may transmit a control signal for controlling, for example, the movement in the pan direction and the tilt direction to the surveillance camera 1. The control unit 41 transmits the control signal transmitted from the server or the terminal device connected to the network to the camera body 12 via the communication unit 44.

The storage unit 46 stores a program for the control unit 41 to operate. The storage unit 46 also stores data for the control unit 41 to perform calculation processing, data for the control unit 41 to control each unit, and the like. The storage unit 46 may be configured by a storage device such as a RAM (Random Access Memory), a ROM (Read Only Memory), a flash memory, and an HDD (Hard Disk Drive).

The control unit 51 of the camera body 12 controls the entire camera body 12. The control unit 51 may be configured by, for example, a CPU or a DSP (Digital Signal Processor).

The power receiving unit 52 includes the power receiving coil 34 illustrated in FIG. 7. The power receiving unit 52 receives, via the power receiving coil 34, power wirelessly supplied from the power transmitting unit 43 of the seat 11. The power receiving unit 52 supplies the received power to each unit.

The communication unit 53 includes the antenna 35 shown in FIG. 7. The communication unit 53 wirelessly communicates with the communication unit 44 of the seat 11 via the antenna 35.

The optical unit 54 includes, for example, a lens, a capturing element, a tilt motor, a pan motor, and the like. The capturing element converts light received via the lens into an electric signal (video data) and outputs the electric signal to the control unit 51. The tilt motor and the pan motor move the camera body 12 in the tilt direction and the pan direction according to the control signal output from the control unit 51.

The storage unit 55 stores a program for the control unit 51 to operate. The storage unit 55 stores data for the control unit 51 to perform calculation processing, data for the control unit 51 to control each unit, and the like. The storage unit 55 may be configured by a storage device such as a RAM, a ROM, a flash memory, and an HDD.

As described above, the surveillance camera 1 includes the seat 11 which is provided with the fitting portion 20 on the outer side of the housing and fixed to the structure A1, and the camera body 12 which is provided on the outer side of the housing with the fitting portion 30 attachable to and detachable from the fitting portion 20. The fitting portion 30 of the camera body 12 includes the recess 30a into which the fitting portion 20 of the seat 11 is fitted. The surface of the fitting portion 20 facing the bottom surface of the recess 30a is formed of the glass 21. The bottom surface of the recess 30a of the fitting portion 30 is formed of the glass 31. The seat 11 includes, on the lower side of the glass 21, the power transmitting coil 24 for wirelessly transmitting power. The surveillance camera body 12 includes, on the lower side of the glass 31, the power receiving coil 34 for receiving power.

As described above, in the camera body 12 of the surveillance camera 1, the glass 31 is arranged on the bottom surface of the recess 30a. In the camera body 12, the power receiving coil 34 and the antenna 35 are arranged on the lower side of the glass 31. The glass 31, the power receiving coil 34, and the antenna 35 are arranged at the recessed position on the housing surface (outer side the housing) of the camera body 12, and thus can be protected from damage due to collision with another object, or the like when the camera body 12 is, for example, moved or cleaned.

Dirt may adhere to the surveillance camera 1. For example, the surveillance camera 1 is covered with a lot of dirt in an environment such as outdoors. Since the camera body 12 of the surveillance camera 1 is attachable to and detachable from the seat 11, the camera body can be detached from the seat 11 and can be easily cleaned.

The housing (surface of the housing) of the surveillance camera 1 is configured by stainless steel and the glasses 21 and 31. For this reason, the surveillance camera 1 has chemical resistance, and there are few restrictions on the use of chemicals used for cleaning.

The power transmitting coil 24 is arranged on the lower side of the glass 21 of the fitting portion 20. The power receiving coil 34 is arranged on the lower side of the glass 31 of the fitting portion 30. Thus, the seat 11 and the camera body 12 can suppress, for example, electric leakage due to rain or the like. The seat 11 and the camera body 12 can prevent water or chemicals from entering the housing during cleaning. Further, the seat 11 and the camera body 12 can be easily cleaned.

Modified Example 1

The camera body 12 may include a wireless communication function such as Wi-Fi or Bluetooth, and may wirelessly communicate with the seat 11 using this wireless communication function. The camera body 12 may wirelessly communicate with devices other than the seat 11 by the wireless communication function such as Wi-Fi or Bluetooth. In this case, the seat 11 and the camera body 12 do not need to include the antenna 25 or 35 on the lower side of the glasses 21 and 31.

Modified Example 2

The surveillance camera 1 may include the antennas 25 and 35 and need not include the power transmitting coil 24 or the power receiving coil 34. In this case, the camera body 12 may include a power cable and may be supplied with power from the power cable.

Modified Example 3

Although the example in which the electronic equipment of the present disclosure is applied to a surveillance camera has been described above, the present disclosure is not limited to this. The electronic equipment of the present disclosure may be applied to, for example, an electric vehicle. In this case, the electric vehicle body may correspond to the camera body 12. A connector of the electric vehicle into which a charging plug of a plug-in station is fitted may correspond to the fitting portion 30. The seat 11 may correspond to, for example, a plug-in station fixed to the ground. The charging plug at the end of a cable extending from a plug-in station may correspond to the fitting portion 20 of the seat 11.

Each functional block used in the description of the embodiment is typically realized as an LSI which is an integrated circuit. These functional blocks may be individually made into one chip, or may be made into one chip so as to include a part or all of the functional blocks. Although the integrated circuit is an LSI in this case, the integrated circuit may be called an IC, a system LSI, a super LSI, or an ultra LSI depending on the degree of integration.

The method of circuit integration is not limited to an LSI, and the circuit integration may be realized by a dedicated circuit or a general-purpose processor. A field programmable gate array (FPGA) that can be programmed after manufacturing an LSI or a reconfigurable processor that can reconfigure the connection and setting of circuit cells inside an LSI may be used.

If integrated circuit technology that replaces an LSI emerges as a result of advances in the semiconductor technology or other technology derived from the semiconductor technology, it is naturally also possible to integrate the functional blocks using the emerged integrated circuit technology. As such an integrated circuit technology, a technology using biotechnology, or the like may be possible.

The present disclosure is useful for an electronic equipment that can suppress damage in pieces of electronic equipment attachable to and detachable from a structure.

The present application is based upon Japanese Patent Application (Patent Application No. 2019-038310 filed on Mar. 4, 2019), the content of which is incorporated herein by reference.

What is claimed is:

1. An electronic equipment comprising:
   an attachment configured to be fixed to an object; and
   a main body, wherein:
   the attachment includes:

a first fitting portion provided on an outer face of a first housing of the attachment and having a first glass; and a power transmitting coil configured to wirelessly transmit power, the main body includes:

a second fitting portion provided on an outer face of a second housing of the main body and having a second glass, the second fitting portion being attachable to and detachable from the first fitting portion; and a power receiving coil configured to wirelessly receive the power transmitted from the power transmitting coil, the power transmitting coil is contained in the first housing of the attachment at a position within a range of an outer peripheral edge of the first glass in view from an attaching direction in which the second fitting portion is attached to and detached from the first fitting portion, and the power receiving coil is contained in the second housing of the main body at a position within a range of an outer peripheral edge of the second glass in view from the attaching direction.

2. The electronic equipment according to claim 1, wherein:

the second fitting portion has a recess into which the first fitting portion is fitted and which has a bottom surface formed of the second glass, and the first fitting portion has a surface which is formed of the first glass and faces the bottom surface of the recess.

3. The electronic equipment according to claim 2, wherein:

the second housing of the main body is comprised of stainless steel.

4. The electronic equipment according to claim 3, wherein:

the attachment includes a first antenna contained in the first housing of the attachment at a position within a range of the outer peripheral edge of the first glass in view from the attaching direction, and the main body includes a second antenna configured to communicate with the first antenna and contained in the second housing of the main body at a position within the range of the outer peripheral edge of the second glass in view from the attaching direction.

5. The electronic equipment according to claim 1, wherein:

the main body is a body of a surveillance camera.

6. An electronic equipment comprising:

an attachment configured to be fixed to an object; and a main body, wherein the attachment includes:

a first fitting portion provided on an outer face of a first housing of the attachment and having a first glass and a first antenna contained in the first housing of the attachment at a position within a range of the outer peripheral edge of a first glass, and the main body includes:

a second fitting portion provided on an outer face of a second housing of the main body and having a second glass, the second fitting portion being attachable to and detachable from the first fitting portion; and a second antenna configured to communicate with the first antenna, the first antenna is contained in the first housing of the attachment at a position within a range of the outer peripheral edge of the first glass in view from an attaching direction in which the second fitting portion is attached to and detached from the first fitting portion, and the second antenna is contained in the second housing of the main body at a position within the range of the outer peripheral edge of the second glass in view from the attaching direction.

7. The electronic equipment according to claim 6, wherein:

the second fitting portion has a recess into which the first fitting portion is fitted and which has a bottom surface formed of the second glass, and the first fitting portion has a surface which is formed of the first glass and faces the bottom surface of the recess.

8. The electronic equipment according to claim 7, wherein:

the housing of the main body is comprised of stainless steel.

9. The electronic equipment according to claim 8, wherein:

the attachment includes a power transmitting coil configured to wirelessly transmit power and contained in the first housing of the attachment at a position within a range of the outer peripheral edge of the first glass in view from the attaching direction, and the main body includes a power receiving coil configured to wirelessly receive the power and contained in the second housing of the main body at a position within the range of the outer peripheral edge of the second glass in view from the attaching direction.

10. The electronic equipment according to claim 6, wherein:

the main body is a body of a surveillance camera.

* * * * *